Jan. 9, 1962

P. G. S. MERO 3,016,419

RECORDING DEVICE

Filed March 9, 1959

INVENTOR.

PETER G. S. MERO

BY *Thomas E. Dorn*

ATTY.

United States Patent Office 3,016,419

Patented Jan. 9, 1962

3,016,419

RECORDING DEVICE

Peter G. S. Mero, 830 Mount Pleasant, Winnetka, Ill.

Filed Mar. 9, 1959, Ser. No. 797,982

2 Claims. (Cl. 178—18)

This invention relates to a new and improved recording device. More particularly, the invention relates to a recording device which is suitable for use in a graphic communication system of the kind in which data is transcribed manually at one station of the system and is automatically reproduced at another station. The invention is especially concerned with a mounting device for a pen or stylus which may be utilized in a recording device of this kind.

In a graphic communication system, a message or other data is manually transcribed upon a writing surface at one station of the system and is automatically reproduced at a second or receiver station in the system. In order to transmit the information necessary for reproduction at the receiver, the transmitter must include a suitable apparatus for analyzing movements of the transmitter stylus, pen, or like device. This apparatus develops electrical control signals which are representative of the movements of the stylus or pen. A preferred system of this kind is described in Patent No. 2,583,535 of Robert Adler, issued January 29, 1952, and in Patent No. 2,649,503 of Robert Adler, issued August 18, 1953. The electromechanical translating apparatus employed for this purpose is preferably made relatively light in weight, in order to minimize inertia effects in the system and to permit convenient operation thereof. Moreover, the translating apparatus must be relatively sensitive in operation and therefore requires maximum protection from misuse on the part of the operator.

For effective and efficient operation, it is highly desirable that a recording device employed in a graphic communication system of this kind afford certain operating characteristics, some of which have heretofore appeared to be mutually contradictory and have therefore led to compromises in design, with the result that optimum performance has been difficult to achieve. For example, the recording device may be utilized by a variety of operators, and the mode of operation may vary to a substantial extent. Thus, one operator may hold the stylus or pen at an acute angle with respect to the writing surface, whereas another operator may hold the pen or stylus almost perpendicular with respect to the writing surface. Moreover, an operator cannot normally maintain a constant angular alignment of the pin, relative to the writing surface, during an ordinary writing operation. Consequently, the mounting provided for the pen or stylus must permit almost universal movement of the pen with respect to that surface in order to afford a convenient writing angle for any operator. On the other hand, since the point of support for the pen cannot be located exactly at the writing tip thereof, any mounting arrangement which provides for universal pivotal movement of the stylus or pen introduces a factor of confusion with respect to the position of the sylus upon the writing surface. In previously known devices, it has been difficult to reduce the area of confusion with respect to position of the stylus and at the same time maintain the requisite universality with respect to angular positioning of the stylus.

Another difficulty introduced by the requirement for virtually universal pivotal movement of the stylus with respect to the writing surface relates to disposition of the pen or stylus when it is not in use. Conventional ball and socket joints, or other universal joints, frequently make it difficult to afford a convenient and safe rest position for the pen. Moreover, such mechanical support arrangements may introduce "play" or lost motion into the electromechanical translating linkage, with the result that information transmitted to the receiver may be somewhat ambiguous in nature.

A primary object of the invention, therefore, is to provide a new and improved recording device which permits substantially universal pivotal movement of a recording stylus or pen with respect to a writing surface, yet which avoids the problems and difficulties set forth hereinabove.

A more specific object of the invention is to afford a new and improved mounting arrangement for the stylus in a recording device for a graphic communication system which inherently reduces confusion and ambiguity, in operation of the recording device, to a minimum.

Another object of the invention is to provide a new and improved recording device, comprising a stylus or pen and a support member for the stylus, which may be easily and conveniently engaged with and disengaged from the stylus.

A further object of the invention is to provide a new and improved stylus support device, suitable for use in the recording apparatus of a graphic communication system, which affords a convenient rest position for the stylus with the stylus supported out of contact with the writing surface.

A specific object of the invention is a new and improved mounting arrangement, for linking the stylus of a graphic communication system with a support arm, which provides for substantially universal pivotal movement of the stylus with respect to a writing surface without requiring a conventional mechanical linkage and which has essentially no lost motion with respect to the stylus or the support arm.

A particular object of the invention is a new and improved support arrangement for the stylus of a recording device suitable for use in a graphic communication system, which support arrangement comprises, essentially, a single and relatively inexpensive piece of plastic or other resilient material.

Other and further objects of the present invention will be apparent from the following description and claims and are illustrated in the accompanying drawings which, by way of illustration, show a preferred embodiment of the present invention and the principles thereof and what is now considered to be the best mode contemplated for applying those principles. Other embodiments of the invention embodying the same or equivalent principles may be used and structural changes may be made as desired by those skilled in the art without departing from the present invention and the purview of the appended claims.

Figure 1:
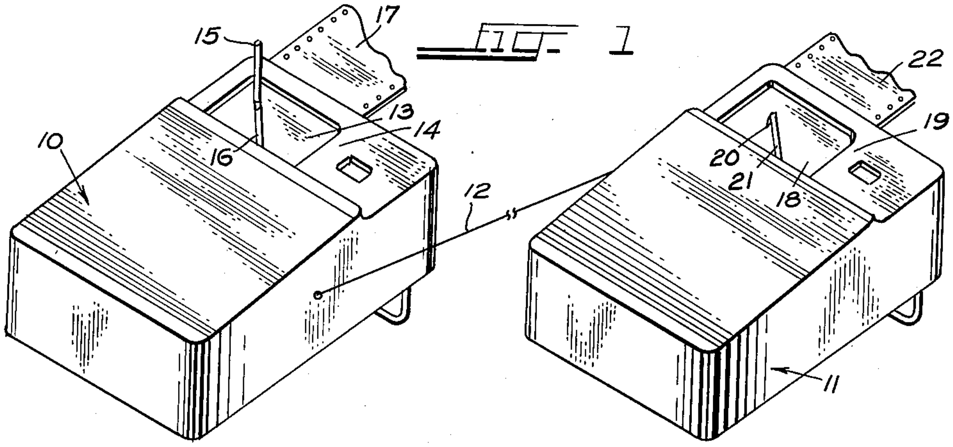
FIG. 1 is a simplified perspective view of a graphic communicating system in which the recording device of the invention may be employed.

The graphic communication system illustrated in FIG. 1 comprises two communication stations 10 and 11 which are electrically connected or otherwise coupled to each other as by a transmission line 12. It should be understood that a radio transmission link or other coupling arrangement may be substituted for the transmission line.

The station 10, in the illustrated system, is a transmitter, whereas the station 11 is a receiver.

The communication station 10 includes a writing surface 13 which is bounded by a portion of the cabinet 14 of the communication station. A suitable recording medium 17, usually paper, may be disposed upon a writing surface 13. The station 10 further includes a writing instrument comprising a stylus or pen 15 which is supported upon an arm or link 16. The support link 16 constitutes a part of the transmitter apparatus and preferably comprises one member of a parallel linkage system in a translating apparatus of the kind described in the aforementioned Patent No. 2,583,535 of Robert Adler.

The communication station 11 is, in many respects, essentially similar in construction to station 10, and includes a writing surface 18 bounded by a part of the cabinet 19 of the station. As in the case of the transmitter 10, the writing surface 18 may be utilized to support a suitable recording medium 22 in position to be engaged by a writing head or stylus 20. The stylus 20 is mounted upon a support arm or link 21 which comprises one member of a translating mechanism similar to that utilized at the transmitter 10. The transmitter unit 10 further includes suitable electrical circuits for translating movements of the stylus or pen 15 into electrical control signals which are transmitted over the line 12 or other coupling link to the receiver 11. The receiver 11, on the other hand, includes suitable circuits and devices for moving the stylus 20 into and out of engagement with the recording medium 22 on the writing surface 18 and for moving the stylus 20 transversely of the writing surface to reproduce information thereon in response to the control signals transmitted from the transmitter 10. The electrical circuits and other operating devices for the transmitter and receiver may be of known construction, particularly as described in the aforementioned Adler patents, and therefore need not be set forth specifically herein.

Figures 2, 3:
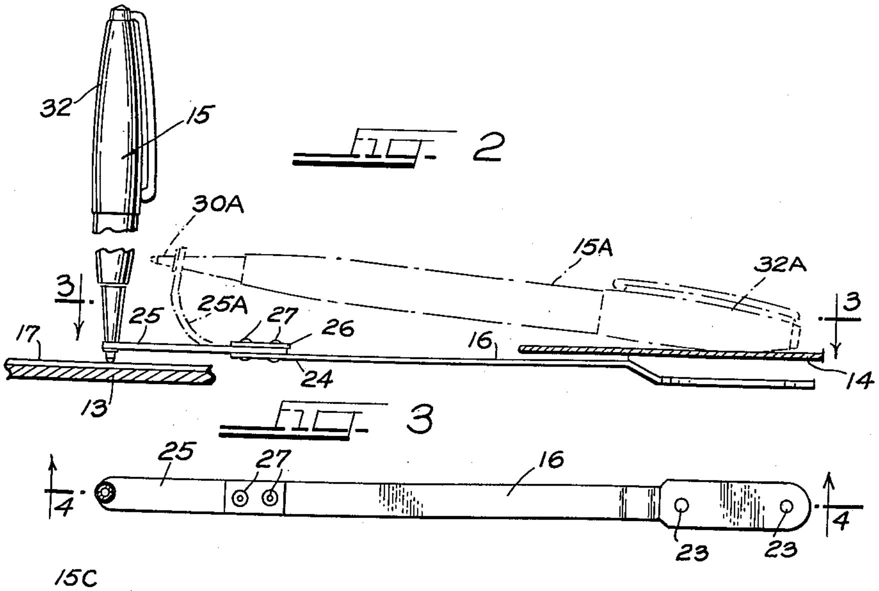
FIG. 2 is an elevation view of a recording device constructed in accordance with a preferred embodiment of the invention, and is drawn to a substantially larger scale than FIG.1.
FIG. 3 is a sectional view taken approximately along line 3—3 in FIG. 2.
Figure 4:
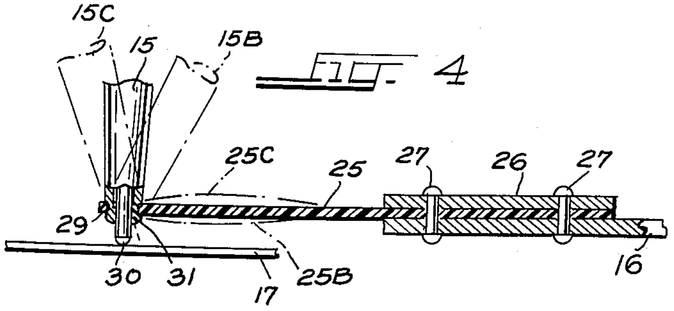
FIG. 4 is a detail sectional view, drawn to an enlarged scale, taken approximately along line 4—4 in FIG. 3.

FIGS. 2, 3 and 4 illustrate a preferred embodiment of the invention and show the mounting arrangement by means of which the pen or stylus 15 is secured to the linkage arm 16. As shown in these figures, the arm 16 preferably comprises a relatively thin lightweight metal member which extends out over the writing surface 13, and thus over the recording medium 17 supported thereon. At one end, the arm 16 is provided with suitable apertures or other means 23 for securing the arm to a translating linkage, as noted hereinabove. At the opposite end 24 of the arm 16 a stylus mounting member 25, which constitutes a cantilever extension of the arm, is mounted thereon. The stylus mounting member 25 is formed from a resilient material; for example, the mounting arm could be constructed from relatively thin resilient brass or from spring steel. Preferably, however, the support member 25 is fabricated from a resilient organic material, such as rubber, synthetic rubber, or plastic. The best material that applicant thus far has discovered for this purpose is a resilient polyethylene terephthalate resin which is commercially available under the trade name Mylar.

The resilient support member 25 is rigidly secured to the arm 16 by suitable means. In the illustrated embodiment, the mounting means for the member 25 comprises a relatively small clamp plate 26 and a plurality of rivets 27 which secure the clamp plate 26 and the support member 25 to the end 24 of the link 16.

At the end of the support member 25 opposite the clamp plate 27, a substantially circular aperture is formed in the resilient support member, as best shown in the enlarged detail view of FIG. 4. The tip of the stylus or pen 15, on the other hand, is provided with a complementary groove 29. The groove 29 is located closely adjacent the writing point 30 of the stylus 15. Preferably, the external diameter of the groove 29 is made as at least as large as the internal diameter of the opening in the support member 25, in order to avoid any subtsantial degree of lost motion or "play" between the stylus 15 and the mounting member 25 when the stylus is mounted in operative position as shown in FIGS. 2 and 4. Below the groove 29 there is a shoulder or abutment 31 on the stylus 15, over which the mounting member 25 must be forced in order to mount the stylus 15 on the mounting member. Plastic or rubber materials are preferred for use in the support member 25 because these materials may be forced over an abutment of this kind without requiring a split or cut in the end portion of the support member.

With the stylus 15 in mounted position, the stylus may be tipped at any desired angle with respect to the link 16, pivotal movement of the stylus being permitted because the support member 25 can be bent or twisted, as shown in FIG. 4, without bending or twisting the link 16. The gripping engagement between the support member 25 and the groove portion 29 of the stylus 15 may be made relatively tight, even to the extent that rotational movement of the stylus with respect to the support member is inhibited. However, this is not disadvantageous, since there is no particular necessity for such rotational movement of the stylus.

In operation, the stylus 15 may be located in a substantially vertical position with respect to the writing surface 13 and the recording medium 17, as shown in solid lines in FIGS. 2 and 4. On the other hand, the stylus may be canted to any desired angle, such as that shown by the dash outlines 15B and 15C in FIG. 4. It should be noted that the stylus cannot be pivoted with respect to the support member 25, at the point where the stylus and support member are joined; rather, it is necessary to bend the support member 25 as indicated by the dash outlines 25B and 25C in FIG. 4. Thus, when the stylus is disposed at an angle as indicated by the dash outline 15B, the support member 25 is bent and its effective length projecting outwardly of the arms 16 is shortened to some extent. As a consequence, the point of contact of the tip 30 with the recording medium 17 remains substantially the same for the stylus in vertical position, as shown in solid lines in FIG. 4, and in angularly displaced position as shown by the dash outline 15B. Thus, the mounting arrangement of the invention effectively minimizes confusion or ambiguity with respect to the position of the stylus point 30 on the recording medium which might otherwise be introduced by pivotal movement of the stylus with respect to the recording medium.

The stylus mounting arrangement of the invention also affords a convenient rest position for supporting the stylus out of contact with the paper or other recording medium 17. Thus, and as illustrated in FIG. 2, the pen or stylus 15 may be set down with the upper end 32 thereof resting upon a portion of the cabinet 14, as indicated by the dash outline 32A. When the pen is lowered to this position, the support member 25 is bent upwardly to the position indicated by dash outline 25A, holding the pen in a position 15A with the tip or writing point thereof disposed well above the surface 13 as indicated at 30A.

The mounting arrangement of the invention is extremely inexpensive, as compared with virtually any kind of mechanical mounting arrangement affording a comparable degree of freedom for pivotal movement. On the other hand, the mounting linkage introduces virtually no lost motion into the composite recording device, thereby avoiding ambiguity in operation. Confusion as to the actual location of the stylus point on the recording medium is reduced to a minimum, particularly when the point of conjunction between the support member 25 and the stylus 15 is located closely adjacent the writing tip 30 of the stylus. Thus, improved performance is achieved simultaneously with a substantial net reduction in cost as compared with conventional mechanical mounting arrangements. At the same time, it is a comparatively simple matter to mount the stylus 15 on the support member 25 by forcing the stylus point into or out of the groove-fitting aperture in the support member.

Figure 5:
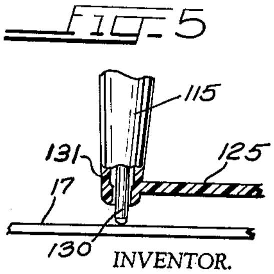
FIG. 5 illustrates a modified embodiment of the invention, in a cross-sectional view similar to FIG. 4.

FIG. 5 illustrates a modified embodiment of the invention which incorporates the support member and the stylus tip in an integrated structure. Thus, in this embodiment of the invention the stylus 115 is provided with a writing tip 130 disposed within a plastic housing 131. A support member 125, corresponding to the member 25 of the embodiment of FIGS. 1–4, is formed integrally with and extends outwardly of the stylus tip. The member 125 may be secured to a suitable support arm, such as the support arm 16, locating the stylus above a paper or other sheet 17. In operation, this embodiment of the invention affords all of the advantages and operating characteristics of the first-described embodiment, and affords the further advantage that the stylus cannot be accidentally disengaged from the support member. Of course, the housing portion 131 of the stylus may be removably joined to the remainder of the stylus, as by threads or other suitable means, to permit removal of the stylus when desired.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A recording device for a graphic communication system transmitter comprising: an elongated stylus member, suitable for manual operation, having a size, weight, and configuration similar to a conventional pen; means for mechanically connecting said stylus member to a graphic communciation system transmitter to translate movements of said stylus member into electrical control signals, said means including a stylus support arm; and mounting means for mounting said stylus member on said support arm, said mounting means comprising a thin resilient support member affixed at one end to the tip of said stylus member and at the opposite end to said support arm, said resilient support member being flexible enough to permit pivotal movement of said stylus member relative to said support arm, by twisting and bending of said support member, in response to ordinary minimal writing forces, said resilient support member further having adequate resilience relative to the weight of the stylus member to prop the stylus member in a predetermined rest position when bent back toward said support arm through an angle of about 90°.

2. A recording device as set forth in claim 1 in which said support member is fabricated from a strip of resilient plastic, and is attached to said stylus member by a press fit into a groove in said stylus member.

References Cited in the file of this patent

UNITED STATES PATENTS

| | | |
|---|---|---|
| 672,631 | Tiffany | Apr. 23, 1901 |
| 2,582,043 | Krahulec | Jan. 8, 1952 |
| 2,847,502 | Rabinow | Aug. 12, 1958 |
| 2,891,107 | Weingart | June 16, 1959 |